Nov. 24, 1953  A. WULLSCHLEGER  2,660,320
PARKING DEVICE FOR VEHICLES
Filed Oct. 16, 1948
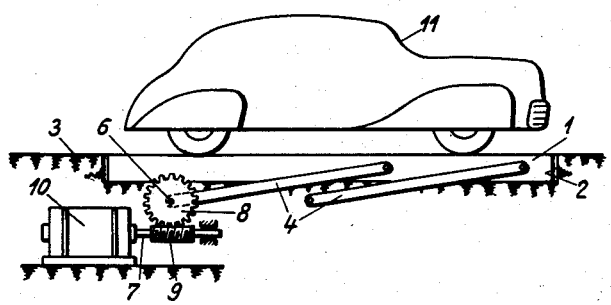
Fig. 1
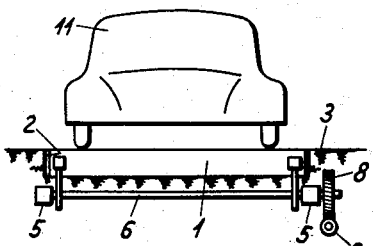
Fig. 2
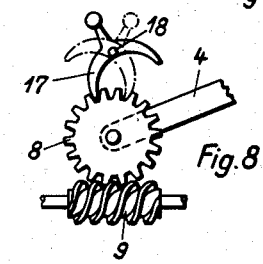
Fig. 8
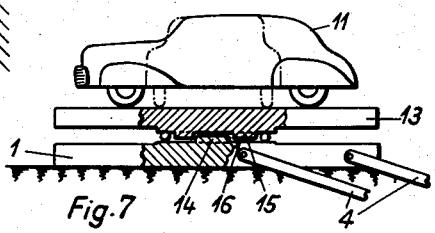
Fig. 7
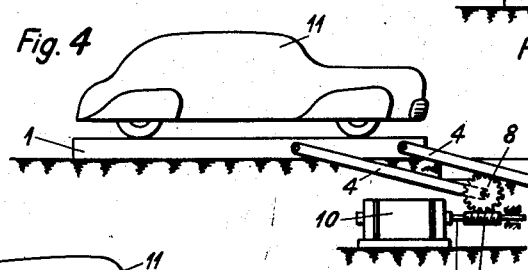
Fig. 3
Fig. 4
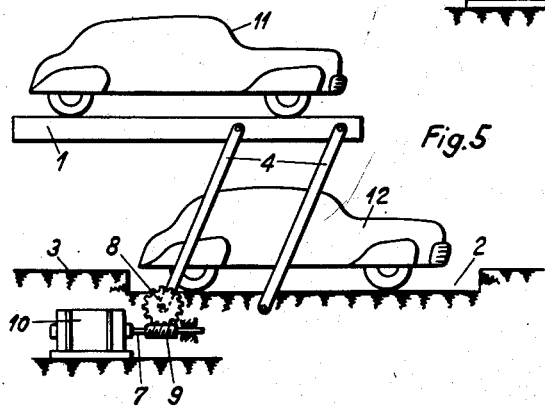
Fig. 5
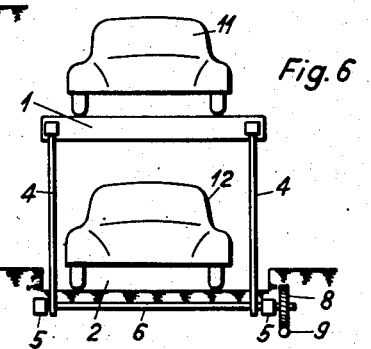
Fig. 6
Inventor
August Wullschleger
by Singer, Ehlert, Stern & Carlberg
Attorneys Patented Nov. 24, 1953

2,660,320

UNITED STATES PATENT OFFICE 2,660,320

PARKING DEVICE FOR VEHICLES

August Wullschleger, Olten, Switzerland

Application October 16, 1948, Serial No. 54,887

2 Claims. (Cl. 214—16.1)

The primary object of the present invention resides in the provision of a parking device which allows storage of two automobiles, one above the other so that twice the number of motor cars can be parked on a given ground space. The parking device according to the present invention allows an unhindered driving of motor cars to the parking space allotted to them. When out of use the parking device can be brought in a position in which it is substantially flush with the ground, in which position motor cars are not prevented from rolling over the same.

The parking device which forms the subject matter of the invention consists of a raisable platform for receiving a first vehicle to be parked, which platform is mounted on parallel pivotally mounted supports of the same length which may be raised to a nearly vertical position so as to elevate the platform and the vehicle thereon. The supports have a length that is greater than the maximum height of a vehicle to be parked so that a second vehicle may be parked beneath the platform when same is raised. The platform is of greater length and width than the maximum width of a vehicle to be parked so that the platform readily receives the vehicle. Because of the width of the platform there is sufficient room for a vehicle to be parked between the supports on either side of the platform when the platform is raised.

Pivotal movement is imparted to the supports by a power drive, and self-braking elements are provided to retain the supports in position. The drive includes a gear fixed to one support and driven by a worm. This arrangement is self-braking that is, the worm will not be rotated when rotary force is applied to the gear, and as a consequence, the platform will not descend under the weight of the vehicle thereon. This self-braking effect may also be accomplished other ways, for example by means of a ratchet and pawl arrangement. It is preferable to position the mechanism in a recess in the ground so that no part of the same projects above the parking lot surface.

In the accompanying drawings one embodiment of the invention is shown by way of example:

Fig. 1 shows the parking device in side elevation in its inoperative position,

Fig. 2 is a back view of the mechanism shown in Fig. 1,

Fig. 3 shows a top view of the mechanism according to Fig. 1.

Fig. 4 is a side view of the lifting device in the position of loading,

Fig. 5 is a side view of the lifting device in its position of use,

Fig. 6 is a back view of the lifting mechanism in the position shown in Fig. 5 and Fig. 7 shows a further embodiment of the present invention.

Fig. 8 shows a locking mechanism for the apparatus.

A platform 1 is sunk in a hole 2 in the ground 3. The hole 2 is of such a shape, that the platform 1, which is of rectangular shape can be easily moved into the said hole 2 and out of the same. The platform 1 is journalled to stays 4 which are parallel to each other and which at their lower ends are journalled in bearings 5. One pair of stays, in Fig. 1 the pair shown on the left-hand side, is inter-connected by a shaft 6 having affixed thereto a worm 8. The said pair of stays and the shaft 6 can be moved in an arc by means of the worm gear 9 disposed on the shaft 7 of the motor 10 and driven by the same. Instead of a motor the platform might of course be activated by any known jack. Instead of two stays 4 only all four stays might be activated by the motor whereas in the modification illustrated in the drawings the right hand stays simply follow the movement of the bridge and support the same. The right hand stays 4 might be driven by inter-connecting them by means of a shaft on which a worm wheel is arranged. The same would then be in engagement with a further worm gear arranged on the shaft 7. The latter would then be extended below the bearings of the right hand stays. In some cases, for instance for very small loads it may be sufficent to positively drive one stay only. The number of stays may be increased if necessary and in any case at least three stays are required.

The lifting device works as follows:

In the position of rest shown in Fig. 1 a motorcar 11 stands on the platform, the top face of which lies in one plane with the top of the surrounding ground.

When making use of the parking device the platform 1 is brought in the position shown in Fig. 4 and the motorcar 11 is driven on the same. By actuating the motor 10, the bridge 1 may then be raised into the position represented by Fig. 5.

It is contemplated that the pitch of the worm gear 9 be such that the gear unit 8—9 is irreversible but special means may be provided for holding the platform 1 in its lifted position. For example a ratchet and pawl mechanism of any well known type may be provided as shown in Fig. 8 where 17 represents the pawl and 18 its pivot pin. In the raised position of the platform a space corresponding to the size of a vehicle remains free below the platform 1 and a second motor car 12 may be placed (Fig. 5) below the car resting on the platform 1.

If the vehicle 11 is to be unloaded, the bridge is brought from the position shown in Fig. 5 to that represented in Fig. 4 by reversing the direction of rotation of the motor 10. During this movement of the platform 1 the same is moving outside the space which is needed by the vehicle 12.

In order to effect a movement of the platform 1 into the position shown in Fig. 4 the supports 4 have to be rotated about their pivot points or shafts 6 through an angle which is greater than 90°, in order that the platform, which originally was positioned in the plane of the ground surface, may be positioned upon the ground adjacent the initial position. For this purpose it is of advantage to attach the supports to the platform at points which are not symmetric to the center of the platform but are moved more or less toward one end thereof while the pivot points or shafts 6 are positioned toward the opposite end of the platform when same is in its normal position.

The modification represented in Fig. 7 differs from that shown in Fig. 1 in that the motor car 11 does not rest directly on the platform 1 supported by the stays 4 but on a second platform 13 rotatably mounted on the first mentioned platform 1 by means of a pivot 15 and a ring 16 resting on the bearing surface 17. When making use of this modification it is obviously possible to turn the upper platform 13 in any direction in which the vehicle is to leave the same.

What I claim is:

1. In a parking device for vehicles, a fixed support, a platform, at least three stays pivoted to said platform with one end, pivot means connecting the other end of said stays to said support so as to maintain said platform in a substantially horizontal position in all angular positions of said stays, and means for rotating at least one of said stays on its pivotal connection with said support, through an angle of approximately 180° thereby permitting the platform to be lowered to the ground level in two separate locations, said stays being located far enough apart in a direction parallel with the axes of said pivots to accommodate a vehicle between them, and the length and arrangement of said stays being such as to accommodate a vehicle beneath said platform when in its raised position and to enable said platform to be lowered at one end of said vehicle without touching the same.

2. A parking device as set forth in claim 1, including a second platform rotatably mounted on top of said first platform for rotation on a vertical axis.

AUGUST WULLSCHLEGER.

References Cited in the file of this patent

UNITED STATES PATENTS

| Number | Name | Date |
|---|---|---|
| 1,524,505 | Blue | Jan. 27, 1925 |
| 1,774,605 | Leonhard | Sept. 2, 1930 |
| 1,849,470 | Wheelock | Mar. 15, 1932 |
| 1,890,796 | Stearns | Dec. 13, 1932 |
| 2,212,940 | Jackson et al. | Aug. 27, 1940 |
| 2,233,055 | Kennedy | Feb. 25, 1941 |
| 2,252,166 | Clawson et al. | Aug. 12, 1941 |
| 2,340,764 | Makaroff | Feb. 1, 1944 |
| 2,480,916 | Gibson | Sept. 6, 1949 |
| 2,497,472 | Sims | Feb. 14, 1950 |
| 2,536,954 | Olsen | Jan. 2, 1951 |

FOREIGN PATENTS

| Number | Country | Date |
|---|---|---|
| 683,036 | France | Feb. 24, 1930 |